US009614961B2

(12) United States Patent
Riefel

(10) Patent No.: US 9,614,961 B2
(45) Date of Patent: Apr. 4, 2017

(54) CONTACT CENTER SYSTEM WITH EFFICIENCY ANALYSIS TOOLS

(71) Applicant: Maximus, Inc., Austin, TX (US)

(72) Inventor: Randall Riefel, Austin, TX (US)

(73) Assignee: Maximus, Reston, VA (US)

( * ) Notice: Subject to any disclaimer, the term of this patent is extended or adjusted under 35 U.S.C. 154(b) by 0 days.

(21) Appl. No.: 14/502,807

(22) Filed: Sep. 30, 2014

(65) Prior Publication Data
US 2015/0131793 A1 May 14, 2015

Related U.S. Application Data

(60) Provisional application No. 61/884,896, filed on Sep. 30, 2013.

(51) Int. Cl.
H04M 3/51 (2006.01)
H04M 3/00 (2006.01)
H04M 3/22 (2006.01)
H04M 3/42 (2006.01)
G06Q 30/02 (2012.01)

(52) U.S. Cl.
CPC ...... H04M 3/5175 (2013.01); G06Q 30/0201 (2013.01); H04M 3/00 (2013.01); H04M 3/22 (2013.01); H04M 3/42 (2013.01); H04M 2203/402 (2013.01); H04M 2203/556 (2013.01)

(58) Field of Classification Search
None
See application file for complete search history.

(56) References Cited

U.S. PATENT DOCUMENTS

| 6,711,253 | B1* | 3/2004 | Prabhaker | H04M 3/36 379/265.01 |
|---|---|---|---|---|
| 7,103,562 | B2 | 9/2006 | Kosiba et al. | |
| 7,937,333 | B2 | 5/2011 | Ryan, Jr. et al. | |
| 8,300,797 | B1* | 10/2012 | Benesh et al. | 379/265.03 |
| 8,401,886 | B2* | 3/2013 | Khetarpal et al. | 705/7.29 |
| 8,488,769 | B1* | 7/2013 | Noble, Jr. | H04M 3/5175 379/265.02 |
| 8,539,493 | B1 | 9/2013 | Robertson et al. | |
| 8,645,175 | B1 | 2/2014 | Arbogast | |
| 8,811,597 | B1* | 8/2014 | Hackbarth | G06Q 10/06395 379/265.02 |
| 8,938,063 | B1* | 1/2015 | Hackbarth | H04M 3/00 379/265.03 |
| 2005/0065837 | A1 | 3/2005 | Kosiba et al. | |

(Continued)

OTHER PUBLICATIONS

International Preliminary Report on Patentability, Application No. PCT/US14/58425, mailed Sep. 24, 2015, 4 pages.

(Continued)

Primary Examiner — Harry S Hong
(74) Attorney, Agent, or Firm — Meyertons, Hood, Kivlin, Kowert & Goetzel, P.C.

(57) ABSTRACT

An agent efficiency analysis system for a contact center performs analysis and comparisons on where the agents' time is being spent. The system integrates data from multiple systems Automatic Call Distribution, Integrated Voice Response and Work Force Management contact center applications and organizes the data against a standard set of metrics. Statistical trend analysis (long-term and short-term) may be performed.

9 Claims, 16 Drawing Sheets

Utilization and Occupancy Summary

(56) References Cited

U.S. PATENT DOCUMENTS

| | | |
|---|---|---|
| 2005/0129212 A1* | 6/2005 | Parker ................. H04M 3/5238 379/265.03 |
| 2005/0135600 A1* | 6/2005 | Whitman, Jr. .......... H04M 3/51 379/266.08 |
| 2005/0135601 A1* | 6/2005 | Whitman, Jr. .......... H04M 3/51 379/266.08 |
| 2006/0129617 A1 | 6/2006 | Nagai et al. |
| 2007/0198322 A1 | 8/2007 | Bourne et al. |
| 2007/0226340 A1 | 9/2007 | Hastings et al. |
| 2008/0172286 A1 | 7/2008 | Ramanujan et al. |
| 2011/0161933 A1 | 6/2011 | Hudson |
| 2012/0014519 A1 | 1/2012 | Kosiba et al. |
| 2012/0051536 A1* | 3/2012 | Chishti et al. ........... 379/265.06 |
| 2012/0087486 A1 | 4/2012 | Guerrero et al. |
| 2013/0132583 A1 | 5/2013 | McCord |
| 2014/0211932 A1* | 7/2014 | Zhao et al. .............. 379/265.06 |
| 2014/0211933 A1* | 7/2014 | Vymenets et al. ....... 379/265.06 |
| 2014/0219436 A1 | 8/2014 | Kosiba et al. |
| 2014/0362984 A1* | 12/2014 | Danson et al. .......... 379/265.06 |

OTHER PUBLICATIONS

International Search Report and Written Opinion, Application No. PCT/US14/58425, mailed Feb. 24, 2015, 19 pages.

International Preliminary Report on Patentability, Application No. PCT/US14/58431, mailed Feb. 16, 2016, 5 pages.

International Search Report and Written Opinion, Application No. PCT/US14/58431, mailed Aug. 27, 2015, 11 pages.

Non-Final Office Action, U.S Appl. No. 14/502,828, mailed Oct. 1, 2015, 13 pages.

International Preliminary Report on Patentability, Application No. PCT/US14/58432, mailed Nov. 12, 2015, 7 pages.

International Search Report and Written Opinion, Application No. PCT/US14/58432, mailed Jun. 18, 2015, 7 pages.

Final Office Action, U.S. Appl. No. 14/502,828, mailed Jun. 2, 2016, 13 pages.

* cited by examiner

| Queue | Calls Waiting | Agents Available | Agents Logged In | Calls Abandoned | Calls Answered | Total Calls | Longest Wait |
|---|---|---|---|---|---|---|---|
| Customer Service | 12 | 9 | 35 | 3 | 266 | 269 | 2:37 |
| Sales | 5 | 15 | 20 | 0 | 104 | 104 | :13 |
| Spanish | 2 | 16 | 18 | 0 | 117 | 117 | :08 |
| Help Desk | 4 | 6 | 15 | 1 | 82 | 83 | :20 |
| Billing | 0 | 5 | 5 | 0 | 27 | 27 | 0:00 |

CONTACT CENTER SYSTEM WITH EFFICIENCY ANALYSIS TOOLS

PRIORITY CLAIM

This application claims priority to U.S. Provisional Application Ser. No. 61/884,896 entitled "CONTACT CENTER SYSTEM WITH EFFICIENCY ANALYSIS TOOLS" filed Sep. 30, 2013, which is incorporated herein by reference in its entirety.

BACKGROUND

Field

The present invention relates to the field of client services. More particularly, the present invention relates to assessing services provided to clients by agents at contact centers.

Description of the Related Art

Consumers, businesses, and other persons who receive products and services from business and government entities often rely on interaction with customer service representatives to carry out transactions or to resolve problems with a product or service. Companies and agencies may that provide such services may need to handle large numbers of client contacts on a daily basis. In many cases, a company or agency sets up a contact center (such as a call center) with a group of agents (for example, customer service representatives) to handle the client contacts. A contact center at one facility may serve all of the clients for a particular state or region, or even worldwide.

Due to the variety and complexity of matters being handled in the contacts, issues handled by a contact center may not be resolved in an efficient manner. For example, in any given case, the actions of one agent may be carried out in a manner that is duplicative or in conflict with those of another agent. In addition, some cases may not be resolved in a timely manner due to agent inefficiencies (for example, performing unnecessary actions) or miscommunication between a customer and an agent, or between agents.

Responding to a request for a particular service, product, or benefit may be a complex process that takes time and involve many steps and interactions (such as, for example, applying for a government benefit.) The amount of resources required (including computing, network, and/or staff) to handle the load may be difficult to predict and plan for. Moreover, defects may occur in processing that prevent or delay successful fulfillment of a request. For example, a request may become stalled or be lost from a processing queue. In addition, in cases where a large number of processes is carried out by multiple computer systems, over multiple channels of communication (for example, voice, web chat, and text), identifying and correcting defects, redundancies, stuck conditions, and inefficiencies in computer processes may be difficult or impossible to do in a timely manner.

SUMMARY

Systems and methods of monitoring and assessing services provided to clients by agents at contact centers are disclosed. In an embodiment, a method of assessing efficiency of agents in a contact center includes monitoring, by a contact center management system implemented on one or more computer systems, activity of one or more agents who perform services at one or more contact centers. Based at least some of the activity, one or more measures of performance are determined for at least one of the one or more agents. At least one of the measures of performance for at least one of the agents includes an occupancy, a utilization, an absentee rate, or a direct labor time per contact. Based on at least one of the measures of performance, one or more statistical values for at least one of the agents are determined by the contact center management system.

In an embodiment, a system includes one or more computer systems configured to implement a contact center management system that is configured to: monitor activity of one or more agents who perform services at one or more contact centers; determine, based at least some of the activity, one or more measures of performance for at least one of the one or more agents, wherein at least one of the measures of performance for at least one of the agents comprises an occupancy, a utilization, an absentee rate, or a direct labor time per contact; and determine, based on at least one of the measures of performance, one or more statistical values for at least one of the agents.

In an embodiment, a non-transitory, computer-readable storage medium includes program instructions stored thereon. The program instructions, when executed on one or more computers. cause the one or more computers to implement a contact center management system configured to: monitor activity of one or more agents who perform services at one or more contact centers; determine, based at least some of the activity, one or more measures of performance for at least one of the one or more agents, wherein at least one of the measures of performance for at least one of the agents comprises an occupancy, a utilization, an absentee rate, or a direct labor time per contact; and determine, based on at least one of the measures of performance, one or more statistical values for at least one of the agents.

In an embodiment, a method of assessing performance in a contact center includes monitoring, by a contact management system implemented on one or more computer systems, activity of agents in a plurality of agent groups who perform services on one or more projects at one or more contact centers. One or more comparisons of agent performance of at least two of the agent groups or at least two of the projects are performed by the contact center management system based on a pre-established efficiency metric.

In an embodiment, a system includes one or more computer systems configured to implement a contact center management system. The contact center management system is configured to: monitor activity of agents in a plurality of agent groups who perform services on one or more projects at one or more contact centers; and perform one or more comparisons of agent performance of at least two of the agent groups or at least two of the projects based on a pre-established efficiency metric.

In an embodiment, a non-transitory, computer-readable storage medium includes program instructions stored thereon that, when executed on one or more computers. cause the one or more computers to implement a contact center management system configured to: monitor activity of agents in a plurality of agent groups who perform services on one or more projects at one or more contact centers; and perform one or more comparisons of agent performance of at least two of the agent groups or at least two of the projects based on a pre-established efficiency metric.

In an embodiment, a method of assessing contact handling includes monitoring, by a contact center management system implemented on one or more computer systems, an interaction arising from a client contact with one or more agents at one or more contact centers. The monitoring includes determining an initiator of the contact, one or more reasons for the contact, one or more actions taken in response to the contact, and one or more outcomes of the contact. A record is created of interaction resulting from the contact from the time the contact was handled by an agent to the time the interaction is completed. The record includes the initiator of the contact, at least one reason for the contact, one at least one of the actions taken in response to the contact, and at least one of the outcomes of the contact.

In an embodiment, a system includes one or more computer systems configured to implement a contact center management system. The contact center management system is configured to: monitor an interaction arising from a client contact with one or more agents at one or more contact center. The monitoring includes determining an initiator of the contact, one or more reasons for the contact, one or more actions taken in response to the contact, and one or more outcomes of the contact. A record is created of interaction resulting from the contact from the time the contact was handled by an agent to the time the interaction is completed. The record comprises the initiator of the contact, at least one reason for the contact, one at least one of the actions taken in response to the contact, and at least one of the outcomes of the contact.

In an embodiment, a non-transitory, computer-readable storage medium includes program instructions stored thereon that, when executed on one or more computers cause the one or more computers to implement a contact management system configured to: monitor an interaction arising from a client contact with one or more agents at one or more contact centers, wherein the monitoring comprises determining an initiator of the contact, one or more reasons for the contact, one or more actions taken in response to the contact, and one or more outcomes of the contact; and create a record of interaction resulting from the contact from the time the contact was handled by an agent to the time the interaction is completed. The record comprises the initiator of the contact, at least one reason for the contact, one at least one of the actions taken in response to the contact, and at least one of the outcomes of the contact.

BRIEF DESCRIPTION OF THE DRAWINGS

FIG. 2 illustrates one embodiment of a tabular report of agent performance.

FIG. 8 illustrates one embodiment of a quarterly inbound contacts by reason report.

FIG. 9 illustrates one embodiment of a monthly inbound contacts by reason report.

FIG. 10 illustrates one embodiment of an outbound contacts by group report.

FIG. 11 illustrates one embodiment of an outbound contacts by reason report.

FIG. 15 illustrates one embodiment of a report on contacts requiring additional work.

Figure 1:
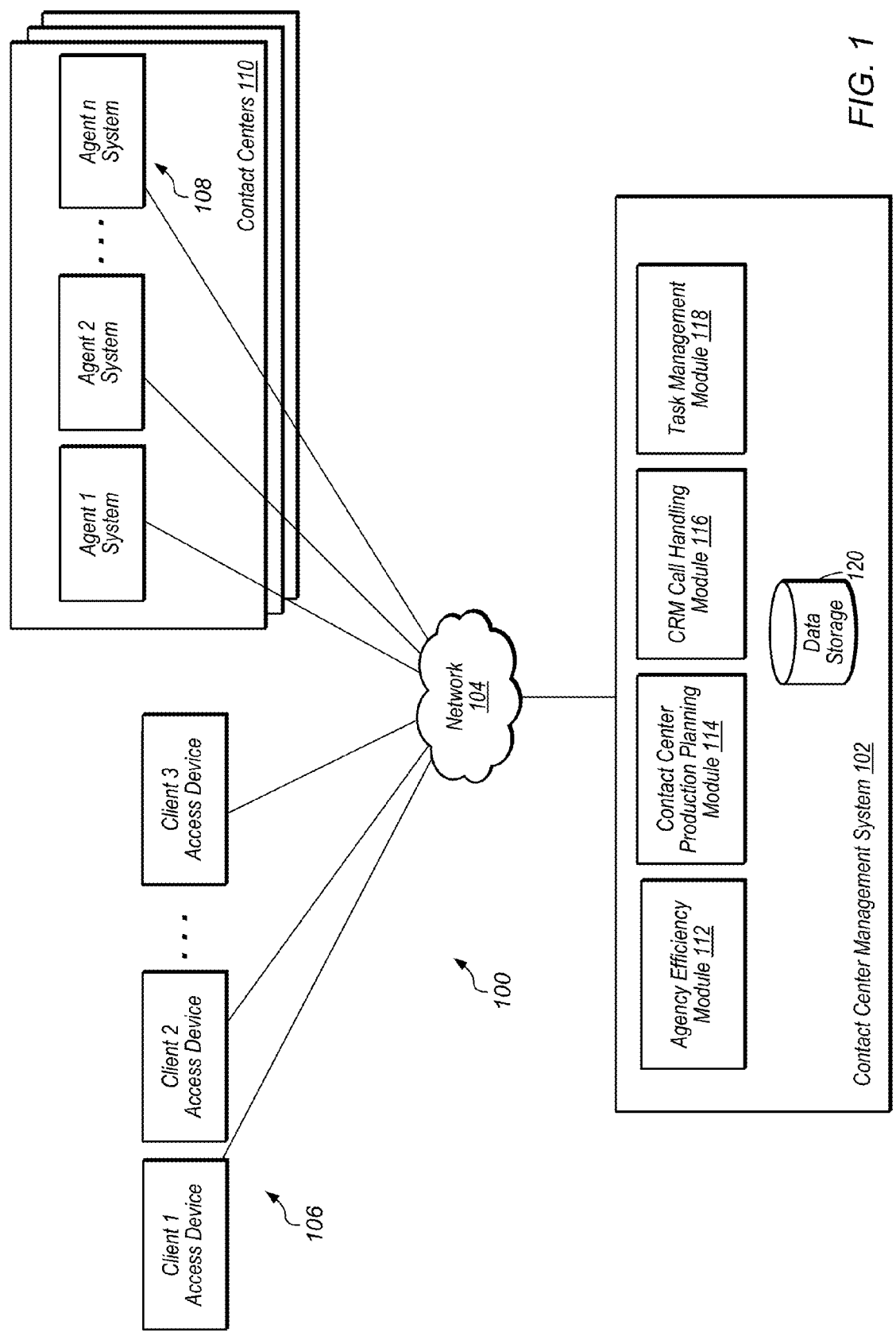
FIG. 1 illustrates one embodiment of a contact center system for providing services to clients.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF ILLUSTRATIVE EMBODIMENTS

In some embodiments, an agent efficiency analysis system for a contact center performs analysis and comparisons on where the agents' time is being spent. The system may acquire and bring together data from multiple systems, including Automatic Call Distribution, Integrated Voice Response and Work Force Management contact center applications, and organize the data against a standard set of metrics. Statistical trend analysis (long-term and short-term) may be performed.

In some embodiments, a system tracks and report performance metrics including Occupancy, Utilization, Absenteeism, and Direct Labor Time per Contact. The system may provide automatic detection of statistically valid high or low performing projects, sites, agent groups, or individual agents. Presentation objects, such as dashboards, reports and alerts, allow management to be informed on performance, spot trends, anticipate and address risks, and take actions to reduce cost and ensure service delivery. If any of the metrics demonstrate statistically significant special cause patterns or exceed defined thresholds, at either a group or individual level, alerts may be sent to supervisors or other appropriate personnel.

In some embodiments, a system enables assessment of projects and groups by comparing performance against standard agent efficiency metrics. Comparisons may be made on a project-to-project, group-to-group, or agent-to-agent basis. Utilization, Occupancy, and Labor Time per Call (across all agents in a project) may be presented in separate statistical control charts for each project where the x-axis is time (for example, a month or week.) Statistically unusual trends may be highlighted. Using simulation and optimization, projections can be made into the future.

As used herein, "client" means, in the context of a provider of products or services, a person who has received products or services, who is receiving products or services, or is seeking to acquire products or services. "Client" includes a person seeking or receiving a benefit (for example, a government benefit such as a tax credit, access to a potential employer, or insurance coverage) or assistance.

As used herein, "contact" refers to a contact by client or other person. Examples of modes of contacts include inbound calls and web chat inquiries. Contacts may originate from any person or group, including customers, subscribers, purchasers, enrollees, potential enrollees, general citizens, providers, health plans, or others, including anonymous callers. "Contacts" also includes program information or health plan enrollment activities.

FIG. 1 illustrates one embodiment of system for providing services to clients from a contact center and performing agent efficiency analysis. System 100 includes contact center management system 102, network 104, client access devices 106, and contact center agent systems 108 at contact centers 110. Clients may communicate with agents at contact center 110. Client access devices 106 may include telephone, mobile phones, personal computer systems, or other electronic device. In some embodiments, client access devices 106 communicate with agents at a contact center via multiple networks. For example, clients using system 100 may variously make contact with the agents by way of the internet, publicly switched telephone network ("PSTN"), and wireless telephone networks.

Contact center management system 102 includes agency efficiency module 112, contact center production planning module 114, CRM call handling module 116, task management module 118, data storage 120. In some embodiments, contact center management system 102 is located at the same facility as one or more of contact centers 110.

In some embodiments, actions carried out by a person or group of persons (for example, agents at a contact center) or processes performed on a computing system are part of an enrollment or application process for an individual or group of individuals to receive a benefit. For example, an individual seeking to enroll in a plan may, by way of a computer network, submit an application for enrollment in an insurance plan, request information about a plan, or make requests for information about a plan, submit information to support an application, or receive notifications relating to the plan. Agents or other service personnel perform actions relating to a benefit, such as handling contacts relating to enrollment requests, determining eligibility, and managing complaints and appeals.

In some embodiments, an agent efficiency module of a contact center management system provides support analysis and comparisons, both inter and intra project, on where agents paid time is being spent. The agent efficiency module may provide the ability to measure key summary metrics. In one embodiment, the module provides measures including occupancy, utilization, absenteeism, and direct labor time per contact. The agent efficiency module may perform analysis and computations to make determinations such as the following:

Where/how are agents spending their time?

Do projects, sites, agent groups, or individual agents that are statistically unusual with respect to labor time per contact?

What is the direct labor cost per call?

Are the types of activities agents are logging time against consistent with project, site, and agent groups' goals?

Are occupancy and utilization metrics achieving goals of the project, site, agent groups, or individual agents?

Is the total agent logged in time consistent with the sum of the agent's time in each activity?

Are there trends in key metrics that indicate improving or declining performance?

The agent efficiency module may operate in conjunction with other contact center modules, including:

Contact Center Production Planning Module

A contact center production planning module may track forecasted contact arrivals against actual arrivals, supports optimizing staffing needs, and analysis of service level performance with contact data collected at intervals (for example, 30 minutes).

CRM—Call Handling Module

A CRM call handling module may monitor and analyze customer contacts (calls, web chats) recorded in the CRM application from the time the contact is handled by project staff to the time it is completed, including the outcome, or actions taken by staff as a result of the interaction.

Task Management Module.

A task management module may monitor all work tasks that are created by contact center agents for others (for example, in the back office) to process or task that contact center agents are to perform when not handling inbound contacts.

In some embodiments, an agent efficiency module integrates data from the ACD (Automatic Call Distributor), a WFM (Work Force Management) application, and a Human Resources (HR) system, or a combination of two or more of such systems. Based on the integrated data, the system may perform trend analysis (short term, long term, or both) on where agent paid time is being spent.

Presentation objects, including dashboards, reports and alerts, may allow management to be informed on performance, spot trends, stay on top of issues, anticipate and address risks, and take actions at an early stage.

In some embodiments, a system provides automatic detection of statistically valid high or low performing projects, sites, agent groups, or individual agents. Projects, sites, agent groups, or agents may compare performance on standardized metrics. Historical information on agent performance may be stored and analyzed.

In some embodiments, a system provides automated alerts. The alerts may mitigate the need to review dashboard and reports frequently and establish a standardized action value.

In some embodiments, a system performs computations and generates graphical or tabular information about operations or processes, such as system performance, agent performance, agent efficiency, task management, workflow management, or defect detection. Information from computations performed by the system may be presented to users in the form of dashboards, reports, and alerts. In some embodiments, the system performs computations to perform an optimization, a simulation, or both.

As illustrated in FIG. 1, contact center management system 102 may include and may be implemented as multiple functional modules or components, with each module or component including one or more provider network resources (e.g., computing resources, storage resources, database resources, etc.). Contact center management system 102 may include more or fewer components or modules, and a given module or component may be subdivided into two or more sub-modules or subcomponents. Also, two or more of the modules or components as shown can be combined.

Contact Center Agent Efficiency Objects

The Agent Efficiency module may include a collection of dashboards, reports, and alerts, and a business intelligence object-building environment. The business intelligence objects may provide contact center management staff with analysis of key agent performance against standardized metrics.

FIG. 2 illustrates one embodiment of a tabular report of agent performance.

Dashboards:

Utilization and Occupancy Summary Dashboard

A Utilization and Occupancy Summary Dashboard may provide Contact Center Sr. Managers with statistical trending analysis into where agent paid time is being spent and ultimately determine and analyze labor time per call. Unpaid time, e.g., granted leave, is also tracked as it a component of labor time.

The following data metrics may be displayed daily, weekly, monthly, or by selectable time period for each site and program across all agents:
  Scheduled Agent Time
  Actual Agent Time
  Scheduled PTO Time
  Unscheduled PTO
  Total Logged in Time
  Total Logged in Time by "Ready" Status Codes
    (1) Talk Time
    (2) Hold Time
    (3) After Call Work, i.e., Wrap Time
    (4) Ring Time
    (5) Idle Time
  Total Logged in Time by "Not Ready" Status
    (1) Training Time
    (2) Meeting Time
    (3) Break Time
    (4) Idle Time
  Utilization %
  Occupancy %
  Total Calls Handled
  Average Handle Time
  Labor Time per Call
  Labor Cost per Call (Optional—only if HR data on hourly rate is available)

Utilization, Occupancy, and Labor Time per Call (across all agents in the selected "set") may be presented in separate statistical control charts. In some embodiments, the x-axis is time, for example, a month, week, or day. Statistically unusual trends may be highlighted.

Additionally, all metrics may be presented in a table matrix where a row is the metric, e.g., Total Logged in Time and the columns time periods. Values that are statistical likely due to "special causes" are highlighted. Sub "totals" (sum, percentages, or averages are included (if more than one row in a group) for, Site, Program, Manager and Supervisor. Grand "totals" are included for the entire data set.

In some embodiments, user input parameters (filters) are Site, Program, Supervisor or Manager, and Time Period.

Agent Level Utilization and Occupancy Dashboard

Agent Level Utilization and Occupancy Dashboard provides supervisors and managers who oversee a group of agents with statistical trending analysis into where individual agent paid time is being spent and ultimately determine and analyze labor time per call.

The dashboard may be organized and present the same metrics as the Utilization and Occupancy Summary (above) however the information is at the individual agent level, with group totals at the Supervisor or Manager level. Additional user input parameters include Agent Name and Agent Group.

Figure 5:
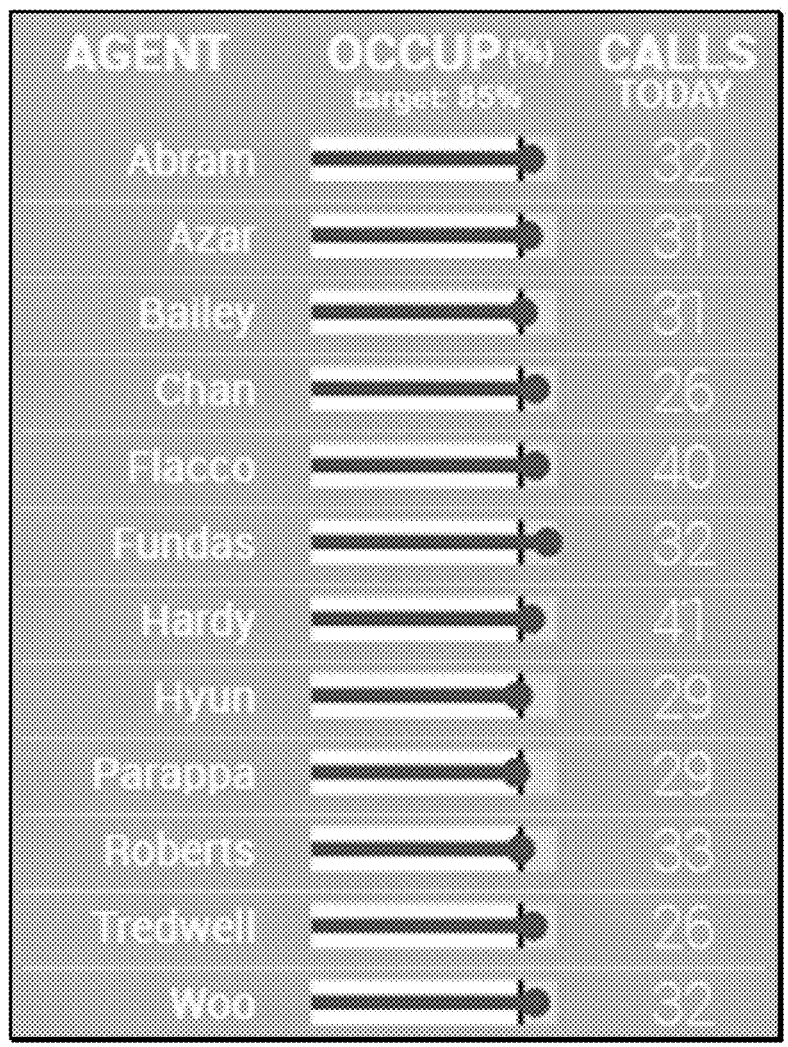
FIG. 5 illustrates one embodiment of a summary for agent-level report for utilization and occupancy.

FIG. 5 illustrates one embodiment of a summary for agent-level report for utilization and occupancy.

Utilization and Occupancy Cross—Project Comparison Summary Dashboard

The Utilization and Occupancy Cross—Project Comparison Summary Dashboard may provide managers with the ability to identify top—performing projects by comparing performance against standardized agent efficiency metrics. The following data metrics may be displayed weekly, monthly, or by selectable time period for each project selected (default is all projects within a region) across all agents:
  Scheduled Agent Time
  Actual Agent Time
  Scheduled PTO Time
  Unscheduled PTO
  Absenteeism Percentage
  Total Logged in Time
  Total Logged in Time—all "Ready" Status Codes
  Total Logged in Time all "Not Ready" Status Codes
  Utilization %
  Occupancy %
  Total Calls Handled
  Average Handle Time
  Labor Time per Call
  Labor Cost per Call (Optional—only if HR data on hourly rate is available)

In an embodiment, Utilization, Occupancy, and Labor Time per Call (across all agents in a project) are presented in separate statistical control charts for each project where the x-axis is time—a month or week. Statistically unusual trends are highlighted.

Additionally, all metrics may be presented in a table matrix where a row is the metric, e.g., Total Logged in Time and the columns time periods. Values that are statistical likely due to "special causes" are highlighted. Sub "totals" (sum, percentages, or averages are included (if more than one row in a group) for each project. Grand "totals" are included across all projects.

In one embodiment, user input parameters (filters) include Region, Project, Program, and Time Period.

Reports

Utilization and Occupancy Summary Report

The utilization and occupancy summary report provides contact center managers with trending analysis into where agent paid time is being spent and ultimately determine and analyze labor time per call in a printable format. This format can also be used to export data to Excel and other formats.

The following metrics may be presented in a table matrix where a row is the metric, e.g., Total Logged in Time with the columns representing time periods (day, week, or month depending on time period selected).

Sub "totals" (sum, percentages, or averages are included (if more than one row in a group) for, Project, Program, Site, Manager, Supervisor and Agent Group. Grand "totals" are included for the entire data set.

Some of the metrics that may be provided include:
  Scheduled Agent Time
  Actual Agent Time
  Scheduled PTO Time
  Unscheduled PTO
  Total Logged in Time
  Total Logged in Time by "Ready" Status Codes
    (6) Talk Time
    (7) Hold Time (8) After Call Work, i.e., Wrap Time
(9) Ring Time
(10) Idle Time
Total Logged in Time by "Not Ready" Status
  (5) Training Time
  (6) Meeting Time
  (7) Break Time
  (8) Idle Time
Utilization %
Occupancy %
Total Calls Handled
Average Handle Time
Labor Time per Call
Labor Cost per Call (Optional—only if HR data on hourly rate is available)

Figure 3:
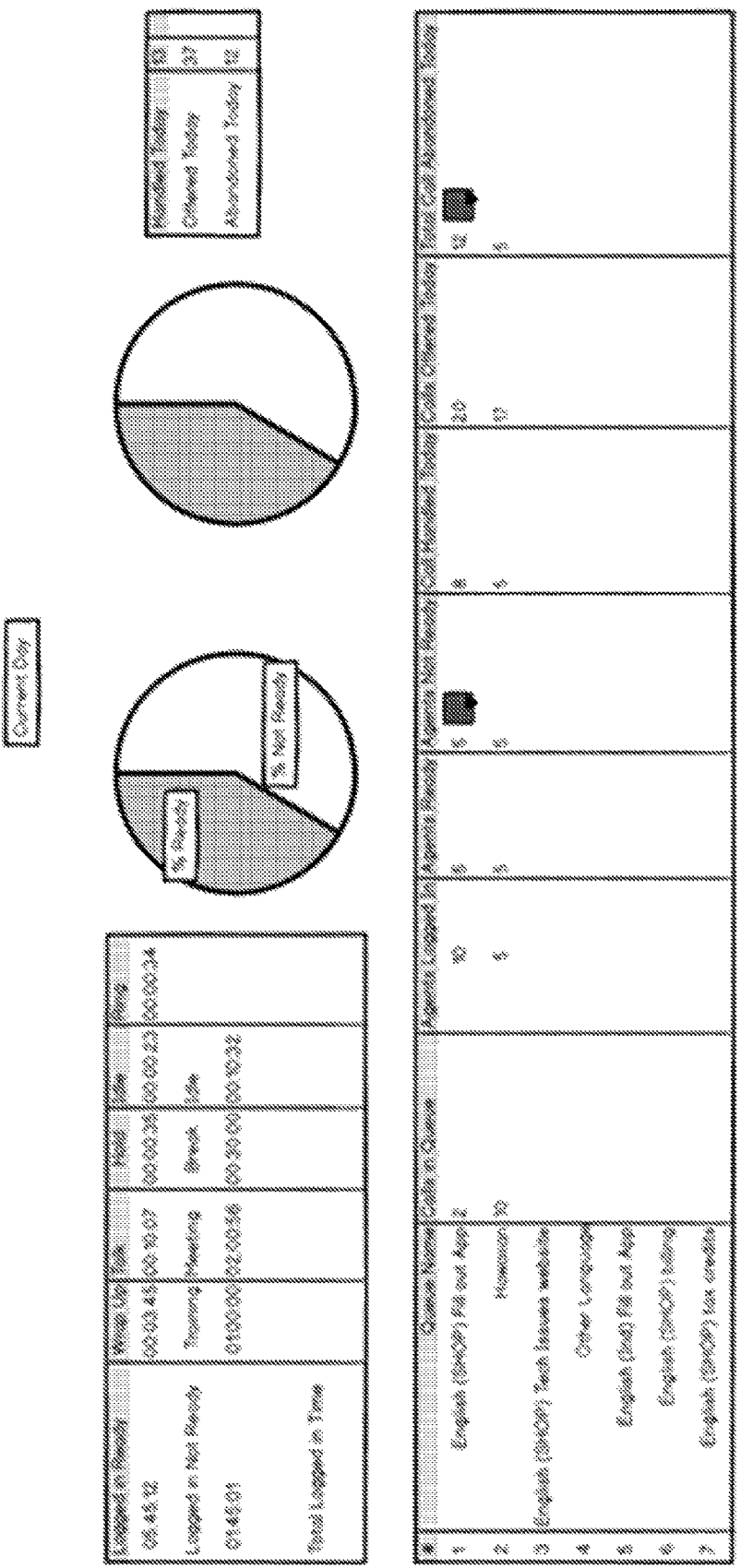
FIG. 3 illustrates one embodiment of a daily utilization and occupancy summary.

User input parameters (filters) are Project, Site, Program, Supervisor or Manager, Agent Group, and Time Period FIG. 3 illustrates one embodiment of a daily utilization and occupancy summary.

Figure 4:
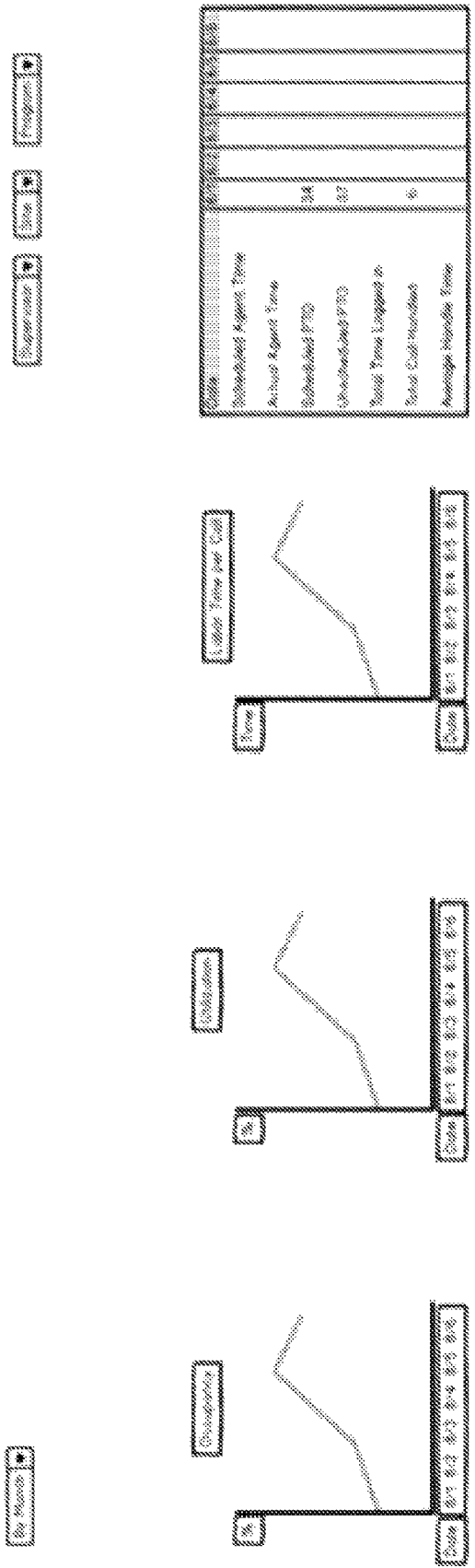
FIG. 4 illustrates one embodiment of a utilization and occupancy summary with line graphs for multiple measures of performance.

FIG. 4 illustrates one embodiment of a utilization and occupancy summary with line graphs for multiple measures of performance.

Project Comparison Summary Report

The project summary comparison report provides managers with ability to identify top—performing by comparing projects against standardized agent efficiency metrics.

The following metrics may be displayed in a table matrix where a row is the metric, e.g., Total Logged in Time with the columns representing time periods (day, week, or month depending on time period selected) for each project selected (default is all projects within a region) across all agents.

Sub "totals" (sum, percentages, or averages are included (if more than one row in a group) for each project. Grand "totals" are included across all projects.

Metrics Included
  Scheduled Agent Time
  Actual Agent Time
  Scheduled PTO Time
  Unscheduled PTO
  Absenteeism Percentage
  Total Logged in Time
  Total Logged in Time—all "Ready" Status Codes
  Total Logged in Time all "Not Ready" Status Codes
  Utilization %
  Occupancy %
  Total Calls Handled
  Average Handle Time
  Labor Time per Call
  Labor Cost per Call (only if HR data on hourly rate is available)

Example user input parameters (filters): Region, Project, Program, and Time Period Alerts Agent Group Efficiency Alerts Automated notification may prevent a missed signal on overall agent efficiency in a dashboard or report from being overlooked. This automated monitoring mitigates the need to review dashboard and reports frequently as well as establishes a standardized action value.

If any of the following data metrics Utilization, Occupancy, or Labor Time per Call for defined agent groups, e.g., the agents that belong to a supervisor, or the agents working a given queue, demonstrate statistically valid "special cause" patterns/thresholds, an alert may be emailed to the supervisor and manager of the agent group. Notified parties can use the Utilization and Occupancy dashboards or reports for additional details.

Individual Agent Efficiency Alert

Automated notification may prevent a missed signal on an individual agent in a dashboard or reports from being overlooked. Automated monitoring mitigates the need to review dashboard and reports frequently, as well as establishes a standardized "action value".

If any of the following data metrics Utilization, Occupancy, or Labor Time per Call for an individual agent demonstrate statistically valid "special cause" patterns/thresholds an alert will be emailed to the supervisor. A notified party can use the utilization and occupancy dashboards or reports for additional details.

CRM Contact Handling

In some embodiments, a contact handling system monitors and analyzes customer contacts (calls, web chats) recorded in a CRM application from the time the contact is handled by project staff to the time it is completed, including the outcome, or actions taken by staff as a result of the interaction. The contact handling system may automatically collect data from sus systems, such as contact center agent systems 108. The system may monitor who is initiating contact (for example, case head for eligible members, providers, general public, etc.), why the contact was initiated (for example, client enrollment, or demographic change), actions taken during the contact, and/or outcome of the contact (for example, enrollment or address change). Actions taken after calls (additional work created) may be assessed to identify process efficiencies (for example, to reduce "hand-offs" between multiple staff performers). The analysis of this information is used to anticipate client needs, improve customer service and reduce operating costs.

In some embodiments, the system detects and multiple (repeat) contact with agents and creates repeat contact reports for use in improving first contact resolution. Projects can define repeat call metrics and automatically monitor contacts without agent involvement. In certain embodiments, alerts for repeat contacts are set based on user-defined criteria.

CRM Contact Handling Module

In one embodiment, CRM contacts are handled by two allied modules:

Contact Center Production Plan Module This module covers three distinct core functionalities: arrival monitoring and service level conformance, forecasting and staff planning:

Tracks actual contact arrivals (transaction volumes) and service level enabling operations to monitor volumes in real time to take action when needed to meet targets and contractual requirements.

Provides visibility into both forecast and actual contact volumes (calls, web chats) at monthly, weekly and daily levels, enabling quick detection if actual volumes deviate from expected volumes.

Ensures staff is doing the right work at the right time by aligning work with the pre-established targets.

Agent Performance Module This module focuses on adherence, and utilization at the individual agent level, and provides metrics including cost per contact, occupancy (paid logged time) and direct labor time per contact.

In some embodiments, a contact handling module provides visibility into: who is initiating contact (e.g. case head for eligible members, providers, general public, etc.), why the contact was initiated (e.g. client enrollment, demographic change), actions taken during the contact, and/or outcome of the contact (e.g. enrollment, address change).

Analysis of this data is used to anticipate client needs, improve client service before clients need to call or deflect to another channel (self-service, email or chat when appropriate).

In some embodiments, a contact handling module monitors and provides information the users about actions taken after the call (additional work created) used to identify process efficiencies to reduce "hand-offs" between multiple staff performers.

In some embodiments, a contact handling module tracks repeat contacts. Projects can define a repeat call metric and automatically monitor contacts without agent involvement.

In some embodiments, this information is provided for all contacts handled (rather than, for example, sample sets only). The information may be used to support continuous process improvement and one-call resolution.

In some embodiments, a contact handling module provides ad-hoc reporting capabilities that allow users to slice and dice data on demand to produce reports that answer business specific questions about their contact center.

In some embodiments, a contact handling module provides a customizable alerting capability to project managers, supervisors, analysts or other project designated staff to be notified upon detection of defined events (e.g., when specific contact reasons exceed thresholds).

In some embodiments, a contact handling module measures key performance indicators and provides reports and analytics. The reports and analytics serve as the basis for mandatory state reports and best practice data visualizations.

Outbound contacts may be in reference to project staff conducting research to resolve incident reports or to support outreach efforts or other enrollment activities.

CRM Contact Handling Operational Dashboard

A CRM Contact Handling Operational Dashboard may provide users with a snapshot into the number of contacts handled (current day as well as a two week trend), the most common reasons for contact, the categories or groups of people (e.g., clients, community organizations) initiating contact.

In an embodiment, the CRM Contact Handling Operational Dashboard is organized into four sections:

1) Daily Summary
Total contacts handled (today) presented numerically
Contacts by hour presented in a bar graph (hover capability provides the count by hour)
First Call Resolution—pie chart provides the percent of clients who only make contact only once within the past week vs. the percent of repeat contacts
2) Weekly Summary
Total Contacts handed by day (past two weeks) presented in a line graph by language (hover capability provides the count by day for each language)
3) Contact Action Summary
Tabulated data provides the top 5 most common actions (as a percentage of total actions taken) previous month vs. current month-to-date
4) Contact Group Summary
Tabulated data provides the distribution of contacts organized by group (case head, CBO, plan/provider) as a percentage of total contacts for the previous month vs. current month-to-date Reports
Inbound Contacts by Group Reports An Inbound Contacts by Group report provides details into the categories or groups of people who have initiated contact with agents for the past quarter. The system may analyze the data and highlights trends or changes over time. This information may be used to assess impacts of policy, program, process changes (did the change increase/decrease who needs to contact the service provider?) and to detect changes in the needs of the people being served. The report may include categories or contact "group" (in rows) and the count and percentage of contacts handled (in columns) for each contact group for the previous three months, as well as the total count and percentage for the three months combined.

Inbound Contacts by Reason—Monthly Report

An Inbound Contacts by Reason report may provide a detailed view into the reasons clients initiated contact, and the actions taken or outcome of the contact, by program and language for the previous full month. This data enables comparison by program and provides insight into differing needs of clients by their spoken language. This tabulated report displays the action taken in rows and with columns providing counts and percentage of actions taken by language and by program for the previous month.

An individual call or web chat may result in multiple actions taken; each action is recorded and made visible in this report.

Inbound Contacts by Reason—Quarterly Report

This report provides a summary of actions taken as a result of client contacts for the prior quarter used to detect trends or changes over time. This is often used to assess impact of policy, program, process changes (did the change increase/decrease why we were contacted or the outcome of the contact?) This report may display the action taken in rows and provides counts and percentage of actions taken by month for the previous three months in columns, as well as the total count and percentage for the three months combined.

Outbound Contacts by Group Report

This report may provide details into the categories or groups of people that a service provider's agents contact usually while performing outreach campaigns, or other enrollment-related activities. This report may display the contact group in rows and the count and percentage of contacts handled by contact group for each of the previous three months, as well as the total count and percentage for the three months combined.

Outbound Contacts by Reason Report

This report provides details into actions taken as a result of outbound contacts initiated by a service provider's agents for the past quarter and is often used to assess the outcome of outreach efforts. This tabulated report displays the action taken on provider-initiated contacts in rows and provides counts and percentage of actions taken by month for the previous three months in columns, as well as the total count and percentage for the three months combined.

Repeat Contacts Summary Report

This report detects clients with multiple (repeat) contacts within a one-week timeframe and is used to support efforts for first contact resolution. This bar graph provides the count of distinct clients (y-axis) by the number of contacts made by that client (x-axis) for the prior month. A user may drill-down for transaction level details.

Contacts by Case or Client Report

This report is used to provide staff a contact history on all calls/web chats handled for a specified case or client and is often used by staff performing research and in incident resolution. This tabulated (grid) report returns transaction level details for the user-defined case or client. Each row represents an individual call/web chat and corresponding columns include details about the contact such as case identifier, contact record identifier, contact start/end date and time, and language among others.

Contacts Requiring Additional Work Report

This report identifies contacts that require additional work by another staff performer. This report is used to identify process efficiencies and other opportunities to reduce "hand-offs". This tabulated report provides the type of coverage and task types created from the contact in rows, and counts of contacts by month in columns for the past three months. The total count for the three months combined (calls/web chats) is also included in column data. A user may drill-down for transaction level details.

Contact Center Exception Report

This report details instances where contact center staff fail to properly process their contacts to completion. These contacts are left "open" in the system and at times are found to have inadequate documentation. This report includes count, start time, end time, record ID and staff performer.

Alerts

Excessive Repeat Contact Alert

The excessive repeat contact alert notifies designated operations analysts when an inbound contact is received for the same client 5 or more times in the past 30 days. Daily alert may be sent to the specified operations supervisor(s) via email along with a link to the "Repeat Contact Summary" which provides details on repeat contacts (including individual transactions)

First Call Resolution Alert

The system may notify specified operational managers if the percentage of first call resolution contacts falls below a predetermined threshold. In one embodiment, the threshold is 80%. Daily alert sent to specified operations managers via email along with a link to the "Repeat Contact Summary" which provides details on repeat contacts (including individual transactions).

Contact Center Exception Alert

Daily process monitoring alert sends a notification to specified operations supervisor(s) when staff deviate from the process to properly complete (end) contact records. Daily alert sent to specified operations supervisor(s) via email along with a link to the "Contact Center Exception Report" which provides transaction details.

Contact Reason Monitoring Alert

Monthly alert notifies specified operations analysts when the distribution of contact "reasons" or "action types" changes by more than 5% month over month. Monthly alert sent to specified operations analysts via email along with a link to the "Inbound Contacts by Reason (Action Type)—Monthly Report."

Contact Group Exception Alert

Monthly alert notifies specified operations analysts when the distribution of contact groups changes by more than 5% month over month. Monthly alert sent to specified operations analysts via email along with a link to the "Repeat Contacts Summary" which provides transaction details.

Dashboards

CRM Contact Handling Operational Dashboard

The CRM Contact Handling Dashboard is the front-end and first line of access to business intelligence and often the best way for project management to gain insights and monitor at a glance the project's operations and performance.

The CRM Contact Handling Operational Dashboard provides a snap-shot into the current daily inbound contact volumes, recent trends in contacts handled by language, and a comparison of the most common actions taken as a result of inbound contacts (current month-to-date vs. previous month).

In one embodiment, the summary dashboard is organized into the following sections:

I. The Daily Summary displays the total volume of contacts handed (current day), the volume of contacts handled by hour, and the percent of calls with first call resolution (within the last week).

II. The Weekly Summary provides trending data on contacts handled for the past two weeks (by language) The Contact Action Summary compares the top N (for example, Top 5) most common actions or outcomes from contacts handled for the previous month vs. the current month-to-date III. Contact Group Summary compares the categories or groups of people initiating contact with agents previous month vs. the current month-to-date.

Figure 6:
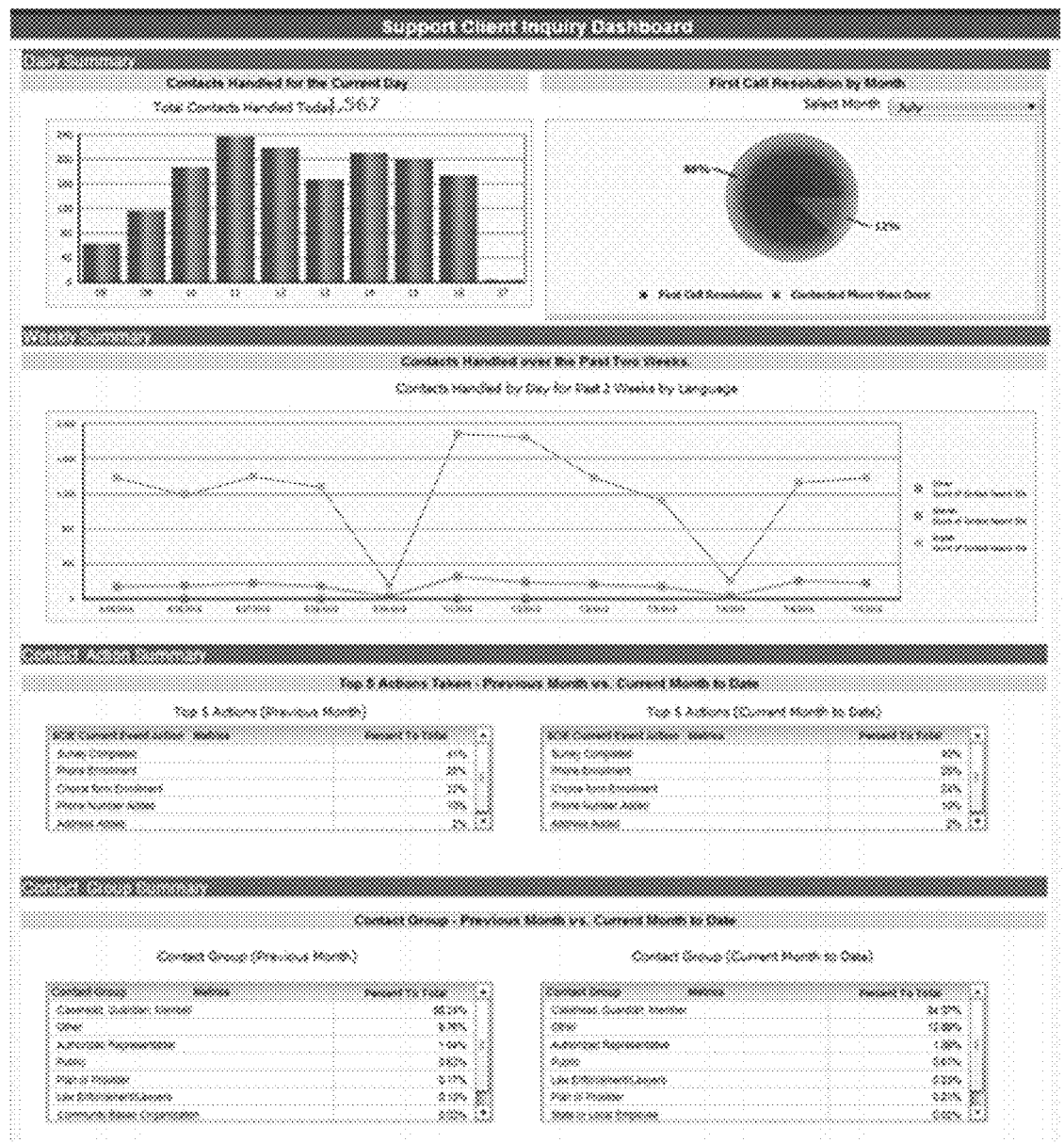
FIG. 6 illustrates one embodiment of a client inquiry dashboard.

FIG. 6 illustrates one embodiment of a client inquiry dashboard.

Inbound Contacts by Group Report

This report provides trending data into who is initiating contact with agents (via inbound calls or web chats) for the past quarter. This provides month over month trending and is often used to assess impacts of policy, program, process changes (did the change increase/decrease who needs to contact us?) and to detect changes in client needs.

Figure 7:
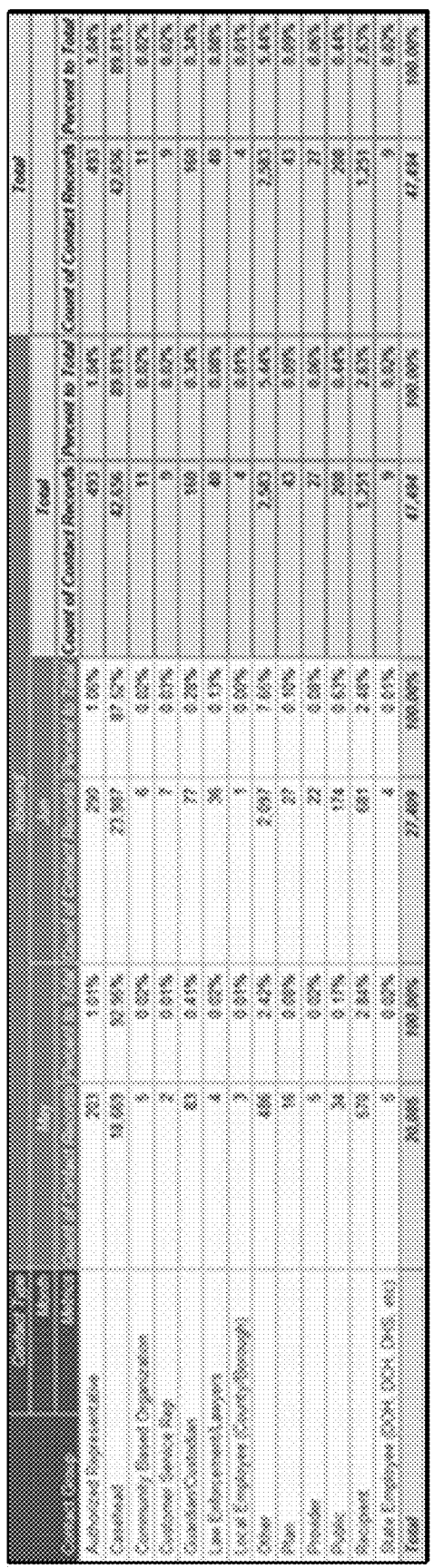
FIG. 7 illustrates one embodiment of an inbound contacts by group report.

FIG. 7 illustrates one embodiment of an inbound contacts by group report.

Inbound Contacts by Reason (Action) Report—Quarterly

This report provides visibility into the reasons clients initiated contact, and the actions taken or outcome of the contact, over the past quarter. This provides month over month trend data to analyze changes to contact drivers over time.

Figure 8:
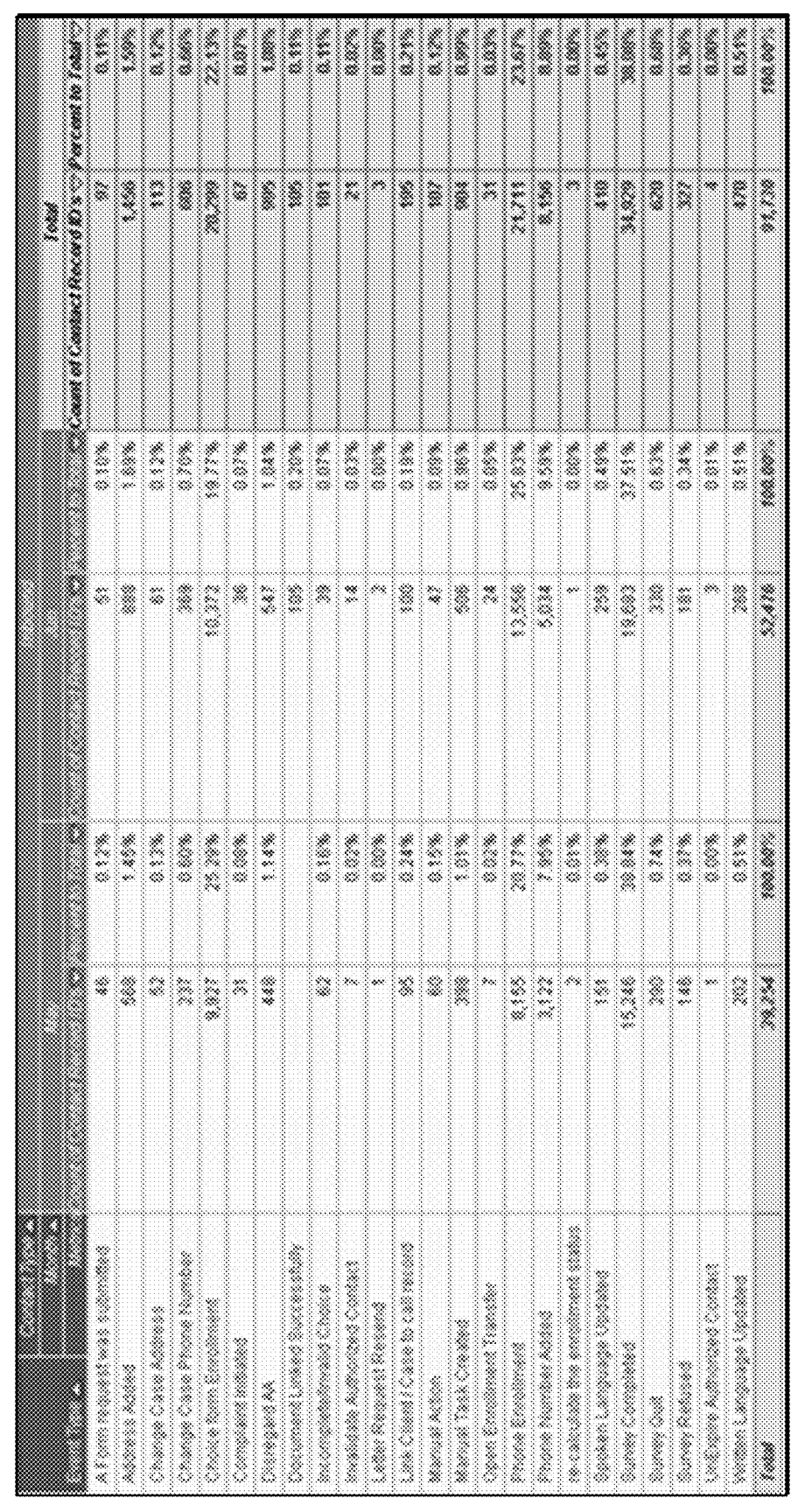

FIG. 8 illustrates one embodiment of a quarterly inbound contacts by reason report.

Inbound Contacts by Reason (Action Report—Monthly

This report provides a detailed view into the reasons clients initiated contact, and the actions taken or outcome of the contact, by program and language for the previous full month. This provides a comparison of call reasons and actions taken or outcomes by language, and provides insight into differing needs of clients by their spoken language.

Figure 9:
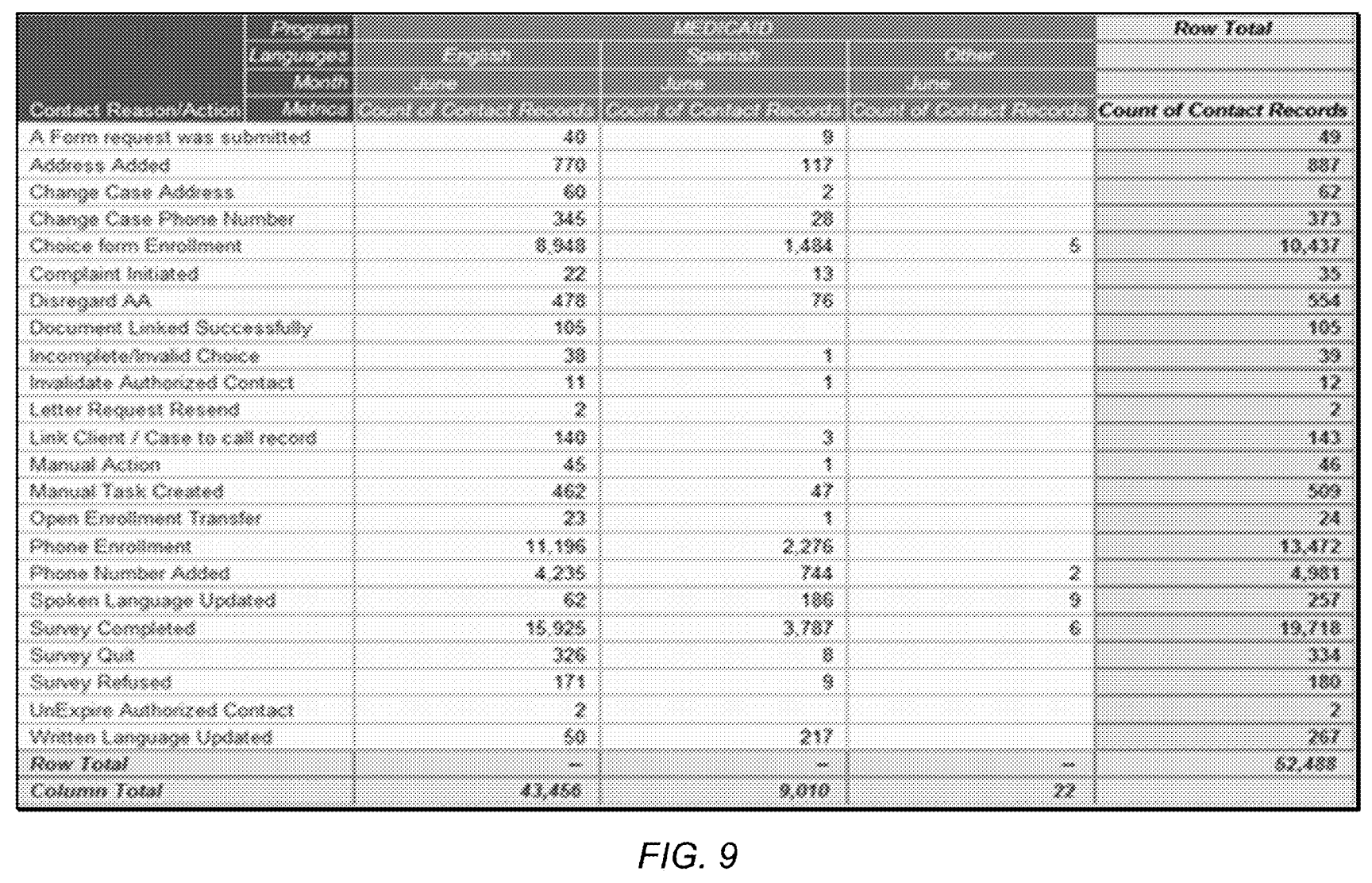

FIG. 9 illustrates one embodiment of a monthly inbound contacts by reason report.

Outbound Contacts by Group Report

This report provides trending data into categories or groups of people that a service provider's agents make contact with (via outbound calls) usually while performing outreach campaigns, or other enrollment-related activities.

Figure 10:
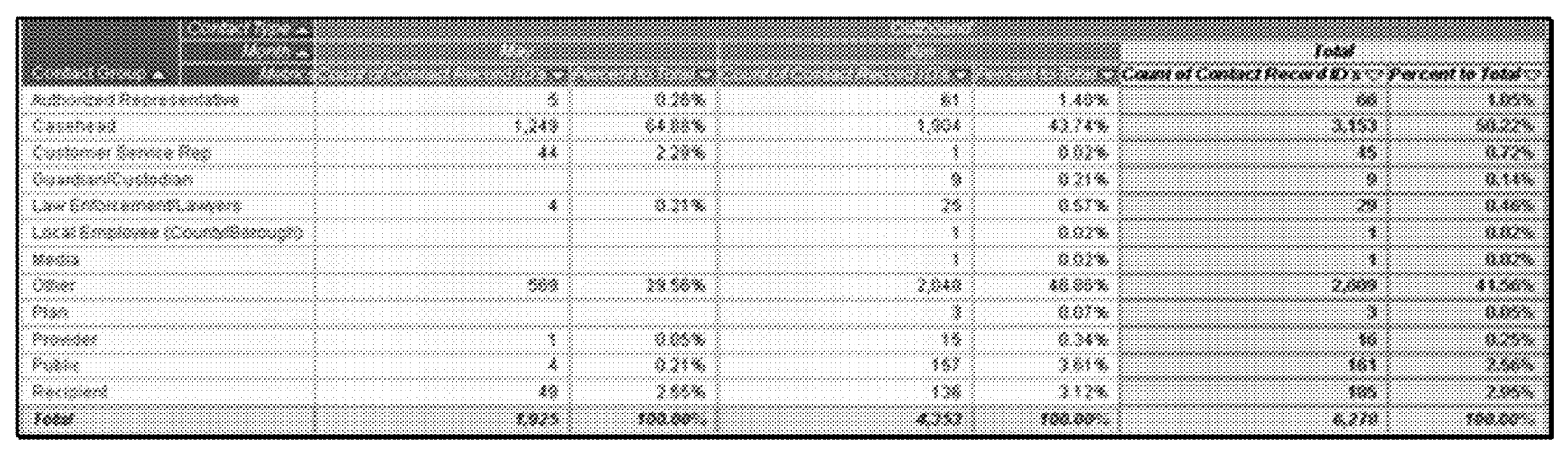

FIG. 10 illustrates one embodiment of an outbound contacts by group report.

Outbound Contacts by Reason (Action Type)-Quarterly Report

This report provides visibility into the reasons service provider-initiated contact with the client, and actions taken or outcome of the contact, over the past quarter. This provides month over month trending data often used to analyze the effectiveness of outbound call campaigns.

Figure 11:
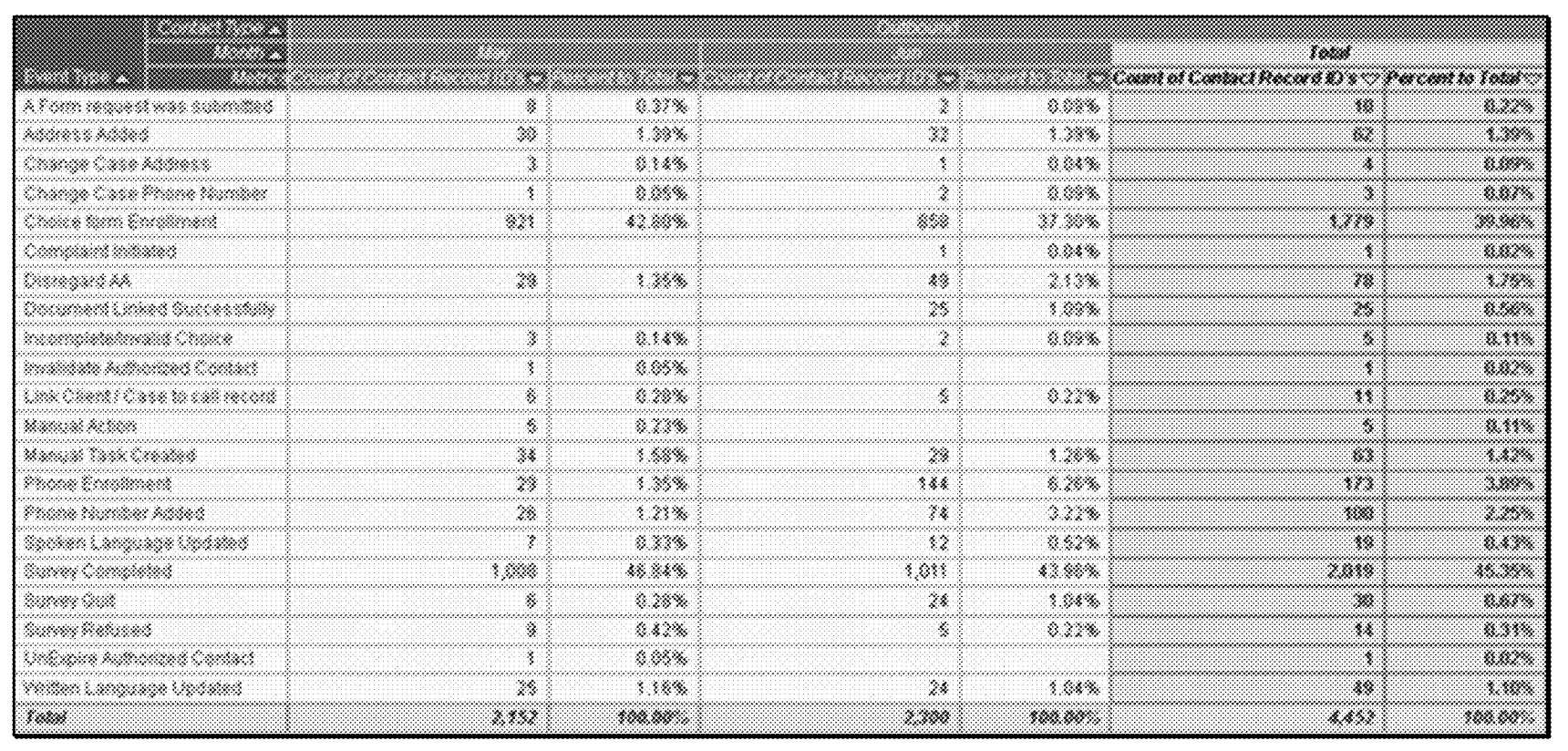

FIG. 11 illustrates one embodiment of an outbound contacts by reason report.

Repeat Contacts Summary Report

This report detects clients with multiple (repeat) contacts with agents and is used to support efforts for first contact resolution. Out of the box metrics return the number of clients (by Client ID) that have made contact with agents two or more times within a user-defined timeframe. The report may allow a user to drill-down to individual transactions.

Figure 12:
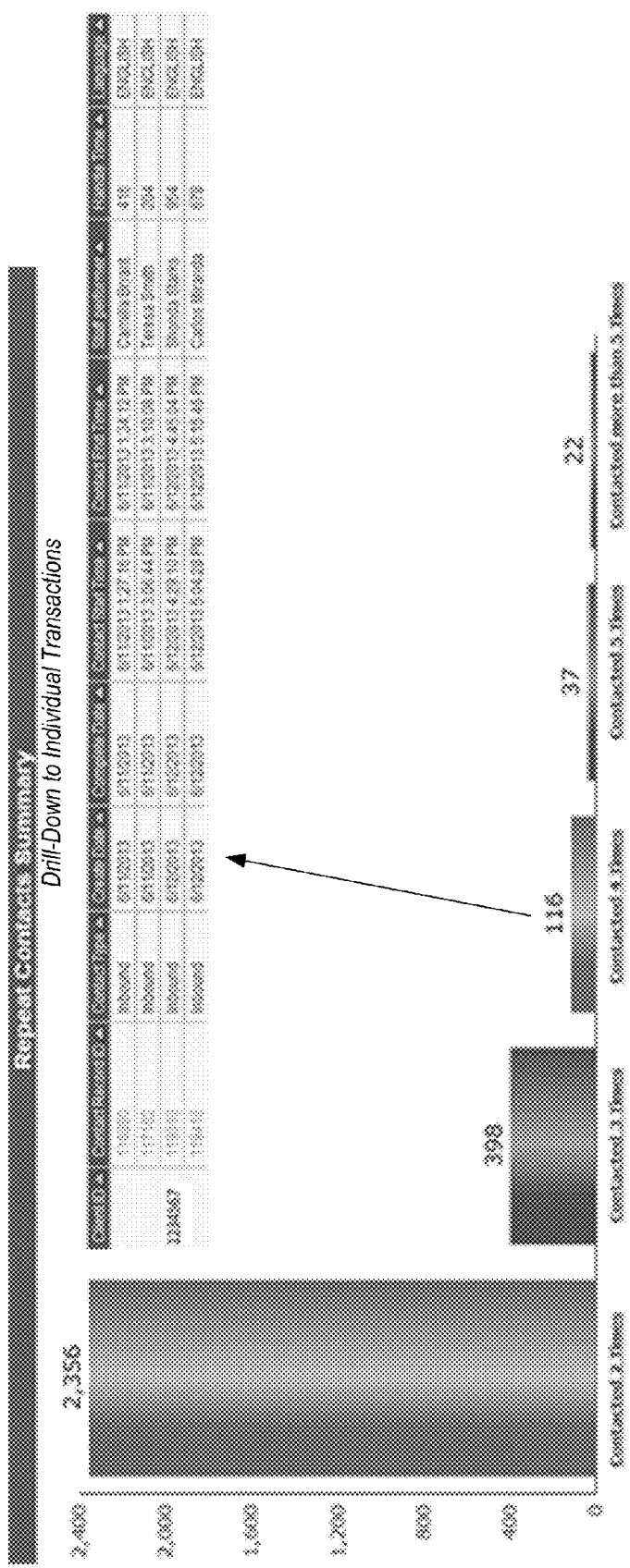
FIG. 12 illustrates one embodiment of a repeat contacts summary report format that allows a user to drill down to individual transactions.

FIG. 12 illustrates one embodiment of a repeat contacts summary report format that allows a user to drill down to individual transactions.

Contacts by Case or Client Report

This report allows staff to enter a case or client ID to view transaction details for all contacts handled for the specific case or client over a user-defined timeframe. This is most often used to support research or analysis efforts.

Figure 13:
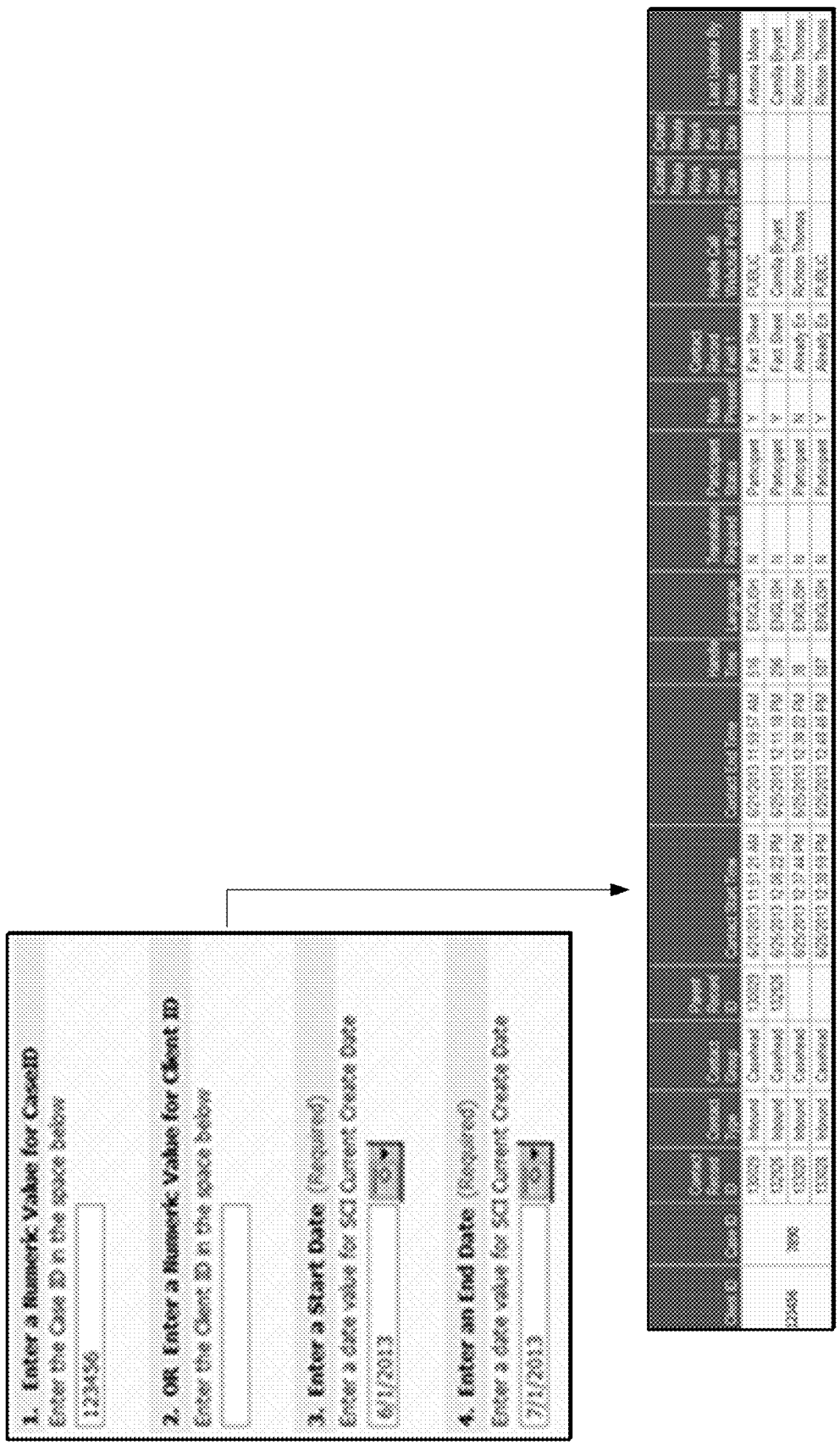
FIG. 13 illustrates one embodiment of a report of contacts by case or by client.

FIG. 13 illustrates one embodiment of a report of contacts by case or by client.

Contact Center Exception Report

This report details instances where contact center staff fail to properly process their contacts to completion. These contacts are left "open" in the system and at times are found to have inadequate documentation. These incidents should be investigated to ensure staff follow established business processes that result in proper contact handling with appropriately documentation. A daily alert to management is included as a standard out-of-the-box feature.

Figure 14:
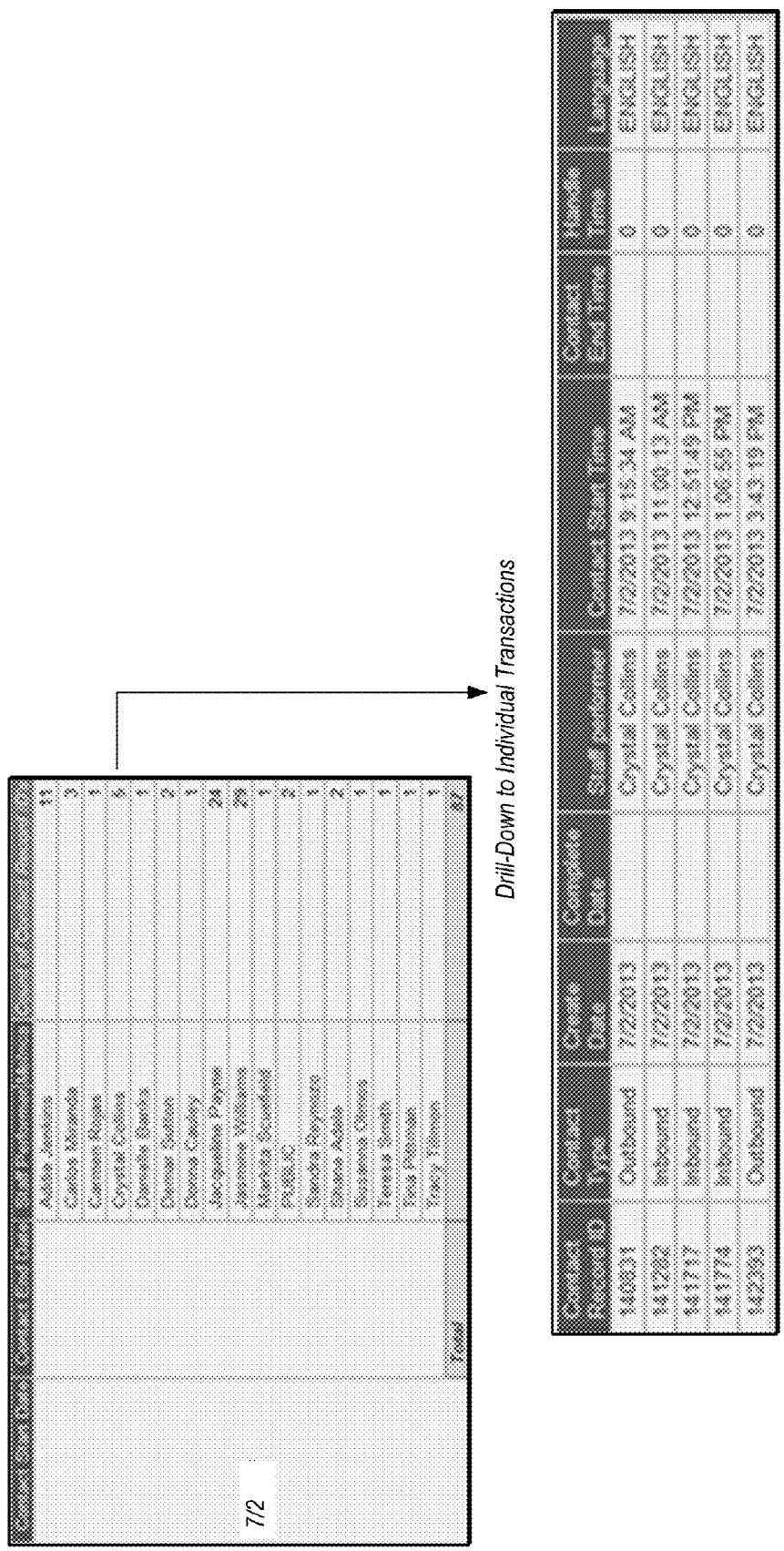
FIG. 14 illustrates one embodiment of a contact center exceptions report.

FIG. 14 illustrates one embodiment of a contact center exceptions report.

Contacts Requiring Additional Work Report

This report provides insight into contacts which cannot be resolved by agents during the initial call and require additional work by another staff performer. This report is used to identify process efficiencies and other opportunities to reduce "hand-offs".

Figure 15:
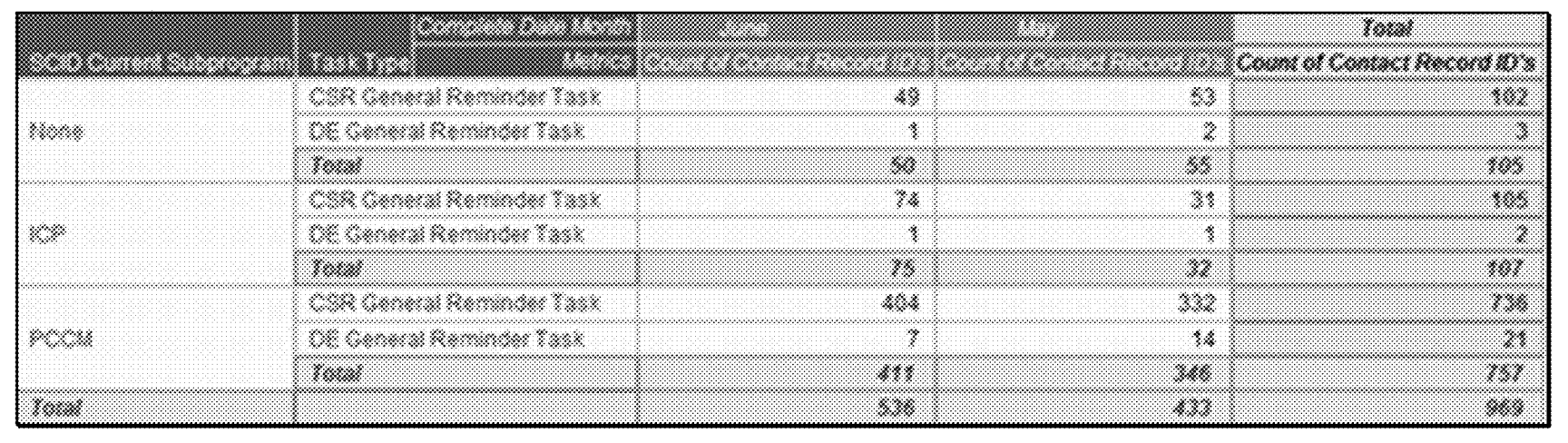

FIG. 15 illustrates one embodiment of a report on contacts requiring additional work.

Alerts

Contact Center Exception Alert.

Daily process monitoring alert notifies specified operations managers when staff deviate from the process to properly complete (end) contact records.

Excessive Repeat Contact Alert.

Daily process monitoring alert notified specified operations analysts when an inbound contact is received for the same client a threshold number of time times in a given period (more than 3 times in the past 30 days).

Contact Reason Monitoring Alert.

Notifies operational managers whenever specified contact "reasons" or "action types" exceeds project defined thresholds.

Contact Group Exception Alert.

Monthly process monitoring alert notifies specified operations managers when the 'Case-head, Guardian or Member' contact category varies by more than a designated percentage month to month.

First-Call Resolution Alert.

Notifies operational managers if first-call resolution percentage drops below a designated threshold percentage.

Figure 16:
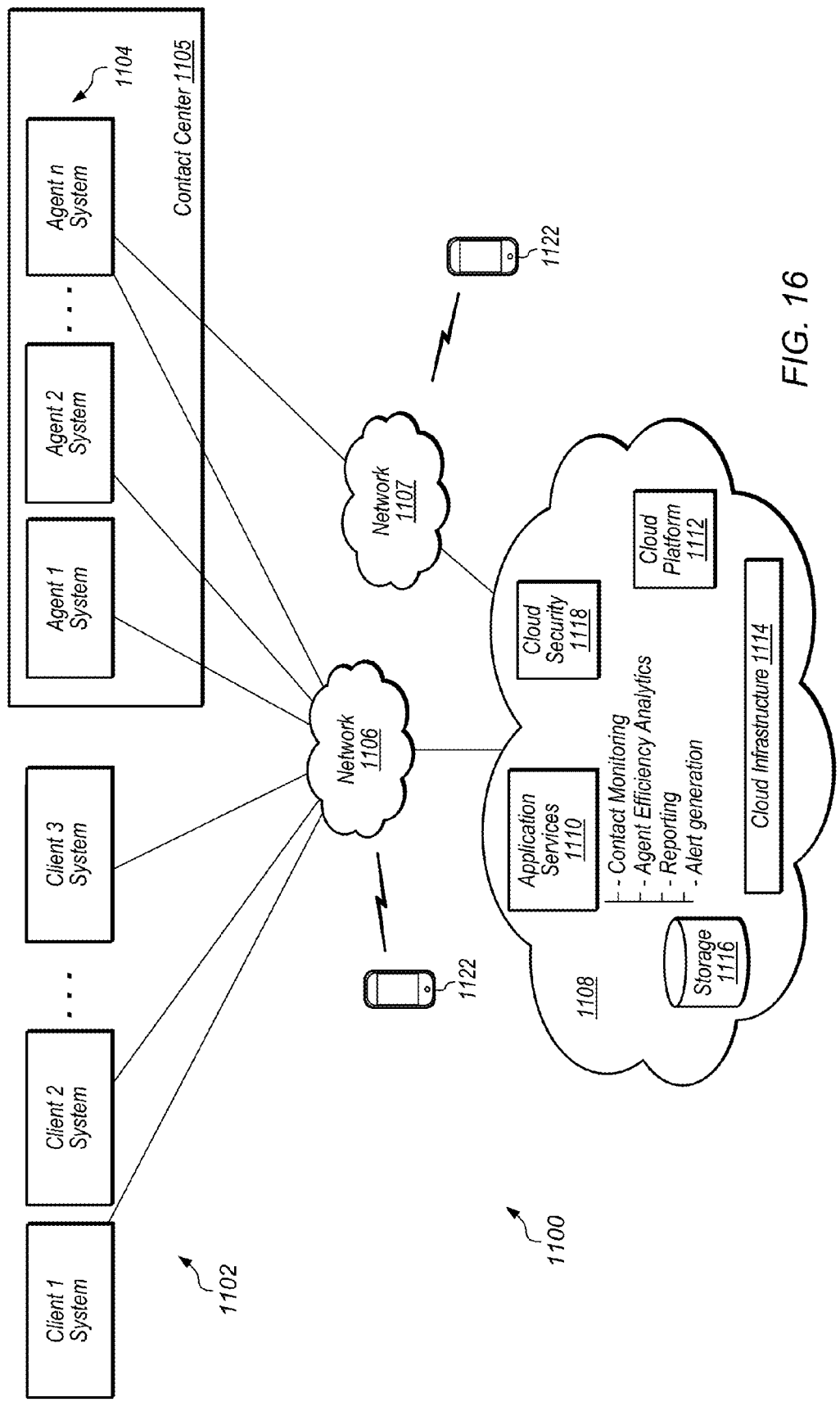
FIG. 16 illustrates one embodiment of a cloud computing system that can be implemented to provide, monitor, and analyze services from one or more contact centers.

In some embodiments, services for assessing operations at a contact center are provided by way of a cloud computing system over a communications network. FIG. 16 illustrates one embodiment of a cloud computing system that can be implemented to provide, monitor, and analyze services from one or more contact centers. System 1100 includes client access devices 1102 accessed by client 1 through client n and agent devices 1104 operated by agent 1 through agent n at one or more contact centers 1105. Client access devices 1102 may be telecommunications devices (for example, mobile phones or land lines) or computing systems (for example, personal computers) connected to network 1106. Each of client access devices 1102 and agent devices 1104 may be connected to cloud computing system 1108 by way of network 1106. In certain embodiments, client access devices 1102 and agent devices 1104 may be connected to one another by way of network 1106.

Cloud computing system 1108 may provide remote computing resources, remote storage resources, or both, for systems connected to cloud computing systems 1108. For example, cloud computing system 1108 may provide cloud computing services to users of client access systems 1102.

Various system architectures may be employed in cloud computing system 1108. Systems and components of cloud computing system 1108 may be at a single physical location, such as a data center, or distributed among any number of locations. Cloud computing system 1108 includes cloud application services 1110, cloud platform 1112, cloud infrastructure 1114, cloud data storage 1116, and cloud security 1118. Cloud applications services may be implemented by way of one or more computer systems, each include one or more central processing units, such as described herein. Examples of application services 1110 include providing contact monitoring, agent efficiency analytics, alert generation, report generation. Cloud application services 1110 may access cloud data storage 1116.

In some embodiments decision support services are provided to users using application services in a computing cloud. In one embodiment, product search, business intelligence, or combinations thereof, are performed as one of application services 1110. In certain embodiments, services in a cloud receive a message feed from a local computing system, such as one or more of data source computing systems 1104, or from third party information providers.

Cloud infrastructure 1114 may encompass a variety of physical resources, such as computing devices, servers, block storage, mass storage devices, file servers, software, and network systems. In some embodiments, a cloud computing system encompasses virtualized resources, such as virtualized data storage or virtualized hardware.

In some embodiments, a service provider provides services to decision makers by way of cloud computing resources. In some embodiments, computation resources are rented or leased to customers of the service provider. In certain embodiments, services are provided to users at sites as software as a service ("SaaS") or platform as a service ("Paas"). Services may be provided to each user on an on-demand basis.

Networks 1106 and 1107 may include any suitable data network or combination of networks that enable the exchange of information between electronic systems. For example, networks 1106 may include one or more Local Area Networks (LANs) such as Ethernet networks, as well as Wide Area Networks (WANs), Metropolitan Area Networks (MANs), or other data or telecommunication networks implemented over any suitable medium, such as electrical or optical cable, or via any suitable wireless standard such as IEEE 802.11 ("Wi-Fi"), IEEE 802.16 ("WiMax"), etc. In various embodiments, all or a portion of networks 1106 may include the network infrastructure commonly referred to as the Internet. In other embodiments, networks 1106 and 1107 may be entirely contained within an enterprise and not directly accessible from the Internet. In certain embodiments, information may be exchanged over a virtual private network. In one embodiment, information is exchanged over the internet, but encrypted in such a way to make a private network not accessible from the rest of the internet.

In various embodiments, some users may be connected over a different network than other users. For example, as shown in FIG. 16, agents may be connected to cloud computing system 1108 over network 1107. In some embodiments, one or more users are connected over a private network. For example, in the embodiment shown in FIG. 16, network 1106 may be a public network and network 1107 may be a private network.

In various embodiments, a user may communicate over systems in system 1100 from locations external to decision makers and cloud computing system 1108. For example, a decision maker may communicate with users at a remote location by way of portable electronic devices 1122. Portable electronic devices 1122 may be located anywhere, including a home, a government office, or any other location.

Although for illustrative purposes only three clients and three contact center agents are shown in FIG. 16, a system may include any number of sites and any number of site computer systems.

Computer systems may, in various embodiments, include components such as a CPU with an associated memory medium such as Compact Disc Read-Only Memory (CD-ROM). The memory medium may store program instructions for computer programs. The program instructions may be executable by the CPU. Computer systems may further include a display device such as monitor, an alphanumeric input device such as keyboard, and a directional input device such as mouse. Computer systems may be operable to execute the computer programs to implement computer-implemented systems and methods. A computer system may allow access to users by way of any browser or operating system.

Computer systems may include a memory medium on which computer programs according to various embodiments may be stored. The term "memory medium" is intended to include an installation medium, e.g., Compact Disc Read Only Memories (CD-ROMs), a computer system memory such as Dynamic Random Access Memory (DRAM), Static Random Access Memory (SRAM), Extended Data Out Random Access Memory (EDO RAM), Double Data Rate Random Access Memory (DDR RAM), Rambus Random Access Memory (RAM), etc., or a non-volatile memory such as a magnetic media, e.g., a hard drive or optical storage. The memory medium may also include other types of memory or combinations thereof. In addition, the memory medium may be located in a first computer, which executes the programs or may be located in a second different computer, which connects to the first computer over a network. In the latter instance, the second computer may provide the program instructions to the first computer for execution. A computer system may take various forms such as a personal computer system, mainframe computer system, workstation, network appliance, Internet appliance, personal digital assistant ("PDA"), television system or other device. In general, the term "computer system" may refer to any device having a processor that executes instructions from a memory medium.

The memory medium may store a software program or programs operable to implement embodiments as described herein. The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes (MFC), browser-based applications (e.g., Java applets), traditional programs, or other technologies or methodologies, as desired. A CPU executing code and data from the memory medium may include a means for creating and executing the software program or programs according to the embodiments described herein.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Methods may be implemented manually, in software, in hardware, or a combination thereof. The order of any method may be changed, and various elements may be added, reordered, combined, omitted, modified, etc. Changes may be made in the elements described herein without departing from the spirit and scope of the invention as described in the following claims.

What is claimed is:

1. A system, comprising:
   a contact center management system implemented on one or more computer systems; and
   two or more agent systems coupled to the contact center management system by way of a communication network, wherein the contact center management system is configured to:
   monitor activity of two or more agents who perform services on the two or more agent systems at one or more contact centers;
   determine, based on at least some of the activity, two or more measures of performance for at least two of the two or more agents, wherein at least two of the measures of performance for at least one of the agents comprises a numerical value corresponding to agent occupancy for at least two periods of time and a utilization for at least two periods of time; and
   determine, based on at least one of the measures of performance, one or more statistical values for at least two of the agents.

2. The system of claim 1, wherein the determining two or more measures of performance for at least two of the two or more agents comprises receiving and integrating, by the contact center management system, data from a workforce management system and a human resources system.

3. The system of claim 1, wherein the statistical values comprise one or more statistical trends.

4. The system of claim 1, wherein at least one of the measures of performance is for performance of one or more groups of agents.

5. The system of claim 1, wherein at least one of the measures of performance is for performance of agents associated with a project.

6. The system of claim 1, wherein the contact center management system is further configured to automatically detect, based at least in part on the measures of performance, a project with project performance outside of a threshold.

7. The system of claim 1, wherein the contact center management system is further configured to send, in a response to an indication of a special cause pattern in performance, an alert to one or more persons.

8. The system of claim 1, wherein the contact center management system is further configured to automatically detect, based at least in part on the measures of performance, a project, group, or individual agent with low and/or high performance.

9. The system of claim 1, wherein the determining two or more measures of performance for at least two of the two or more agents comprises integrating, by the contact center management system, data from a workforce management system and a human resources system.

* * * * *